United States Patent
Zhang et al.

(10) Patent No.: US 9,016,443 B2
(45) Date of Patent: Apr. 28, 2015

(54) METHOD FOR PRODUCING BRAKE DRUM AND A BRAKE DRUM

(71) Applicant: Jiaxing Stone Wheel Co., Ltd., Jiaxing, Province of Zhejiang (CN)

(72) Inventors: Jianrong Zhang, Jiaxing (CN); Qiangsheng Lin, Jiaxing (CN); Jianming Chai, Jiaxing (CN); Xinsheng Wu, Jiaxing (CN); Zhikun Zhou, Jiaxing (CN)

(73) Assignee: Jiaxing Stone Wheel Co., Ltd (CN)

( * ) Notice: Subject to any disclaimer, the term of this patent is extended or adjusted under 35 U.S.C. 154(b) by 1 day.

(21) Appl. No.: 13/950,102

(22) Filed: Jul. 24, 2013

(65) Prior Publication Data
US 2014/0034433 A1 Feb. 6, 2014

(30) Foreign Application Priority Data
Jul. 31, 2012 (CN) .......................... 2012 1 0269589

(51) Int. Cl.
*F16D 65/10* (2006.01)
*B22D 13/04* (2006.01)
*F16D 65/02* (2006.01)

(52) U.S. Cl.
CPC ............... *F16D 65/10* (2013.01); *B22D 13/04* (2013.01); *F16D 2065/132* (2013.01); *F16D 2065/1344* (2013.01)

(58) Field of Classification Search
USPC ..................... 188/74, 78, 218 R; 29/527.7
See application file for complete search history.

(56) References Cited

U.S. PATENT DOCUMENTS

| | | | | |
|---|---|---|---|---|
| 2,028,573 A | * | 1/1936 | Surtees ..................... | 188/218 R |
| 2,061,769 A | * | 11/1936 | Harold et al. ................ | 148/650 |
| 2,112,697 A | * | 3/1938 | Van Halteren .................. | 29/414 |
| 2,126,945 A | * | 8/1938 | Bragg ....................... | 188/218 R |
| 2,485,969 A | * | 10/1949 | Johnson ........................ | 72/180 |
| 3,343,927 A | * | 9/1967 | Brede, III et al. ......... | 188/218 A |
| 3,354,535 A | | 11/1967 | Winnai et al. | |

(Continued)

FOREIGN PATENT DOCUMENTS

EP 0781935 A2 7/1997
WO 2012/058883 A1 5/2012

OTHER PUBLICATIONS

International Search Report of international patent application PCT/CN2011/071163, dated Aug. 11, 2011, ISA/CN, Beijing, China, 3 pages.

(Continued)

*Primary Examiner* — Christopher Schwartz
(74) *Attorney, Agent, or Firm* — Marger Johnson & McCollom, PC (57) ABSTRACT

The present invention discloses a method for producing brake drum, wherein three different metallic materials are used for the three-layer construction; and two layers made of different molten metallic materials are cast based upon the prefabricated steel shell (with steel or gray iron for the structural layer and the Mo-containing, abrasion-resistant alloy cast iron for the braking friction layer) so that atoms from these two adjacent but different metallic layers inter-diffuse across the interface to form a solid fusant or an inter-metallic compound, thereby generating a very strong metallurgical bond. The present invention also provides a brake drum, comprising a brake drum shell, a structural layer inside the brake drum shell, and a friction layer inside the brake drum structural layer and for braking.

10 Claims, 6 Drawing Sheets

(56) References Cited

U.S. PATENT DOCUMENTS

| | | |
|---|---|---|
| 5,285,874 A | 2/1994 | Revyn |
| 5,782,324 A | 7/1998 | Wall |
| 6,148,498 A * | 11/2000 | Knauer .................. 29/527.7 |
| 6,196,363 B1 * | 3/2001 | Wall .................... 188/218 R |
| 6,206,150 B1 | 3/2001 | Hill |
| 6,241,056 B1 | 6/2001 | Cullen et al. |
| 6,601,284 B1 | 8/2003 | Wall |
| 7,677,144 B2 | 3/2010 | Brotherton et al. |
| 2007/0286961 A1 * | 12/2007 | Pahle et al. .................. 427/449 |

OTHER PUBLICATIONS

European Search Report of European patent application EP 96120771, dated Jan. 28, 2000, European Patent Office, Munich, Germany, one page.

* cited by examiner

Cut blank steel into a round piece with a hole in center

FIG. 3-1

Extrusion stretch the round piece on a press machine

A bowl-shaped semi-finished shell after extrusion stretch

FIG. 3-2

Apply power spinning on a spinning machine

A cylindrical semi-finished shell with a raised pattern after power spinning

FIG. 3-3

Make the cylinder wall wavy by using a roller mill

A finished brake drum shell

FIG. 3-4

Cast a structural layer
inside the steel shell

FIG. 3-5A

Cast a Mo-containing alloy braking friction layer on the
structural layer

METHOD FOR PRODUCING BRAKE DRUM AND A BRAKE DRUM

CROSS REFERENCE TO RELATED APPLICATION

This application claims priority to co-pending Chinese patent application no. 201210269589.6, filed Jul. 31, 2012, herein incorporated by reference.

TECHNICAL FIELD

This invention relates to automotive brake devices and in particular relates to a method for producing brake drum and a brake drum structure.

BACKGROUND OF THE INVENTION

Braking system is an important component of automotives. Currently, conventional one-piece-cast drum-type brake is widely applied in vehicles.

In the prior art, a typical drum-type brake comprises a brake drum and brake shoes that will get into contact with the inner side surface of the brake drum. The brake drum is rotating when the vehicle is being driven. Should braking be needed, brake shoes will press against the brake drum under the brake force and convert the kinetic energy of moving vehicle into heat energy by making use of the frictional resistance against the brake drum, thus slowing down or even stopping a moving vehicle to ensure driving safety.

When a vehicle is loaded and driving at a high speed, particularly on a long downward road or a steep slope, the need for a greater brake force and continual braking actions to control the vehicle will increase the temperature on the interior wall of the brake drum drastically, giving rise to an increased difference in temperature inside and outside the brake drum and crippling subsequently the mechanical properties of materials at high temperature. As a traditional material for one-piece cast brake drum, gray cast iron is characterized by low strength and brittleness. In order to alleviate the negative impact of these characteristics in this case, the wall of a brake drum must be thick enough so that the brake drum can have a higher structural strength as a whole. However, the thicker the wall of the brake drum is, the greater the temperature difference will be when the brake drum is braking. An increased temperature difference will give rise to a thermal stress, which plus deteriorated mechanical properties of the material at high temperature will often lead to a cracked interior wall of the drum from longitudinal micro-cracks, then a cracked drum, and even final break. Therefore, a traditional one-piece cast brake drum usually has a relatively short life and poor safety performance.

U.S. Pat. Nos. 5,782,324 and 6,196,363 (Wall) propose a composite brake drum and method of making a brake drum consisting of two layers: a one-piece mounting flange and shell and a liner cast integrally in the shell. This structure is disadvantageous.

In summary, how to improve the structural strength, thermal conductivity, life and safety of the brake drum has become a problem needed to be solved.

SUMMARY OF THE INVENTION

The present invention intends to solve a technical problem, for which it provides a method for producing a brake drum, and a brake drum wherein the brake drum, produced with said method, can improve its structural strength and thermal conductivity, reduce the weight, extend the service life, and enhance the safety. Further, owing to the steel shell and the power spinning technique, the brake drum provided by the present invention thins its wall generally and thus is characterized by a light weight and a fuel-saving benefit.

Figure 2:
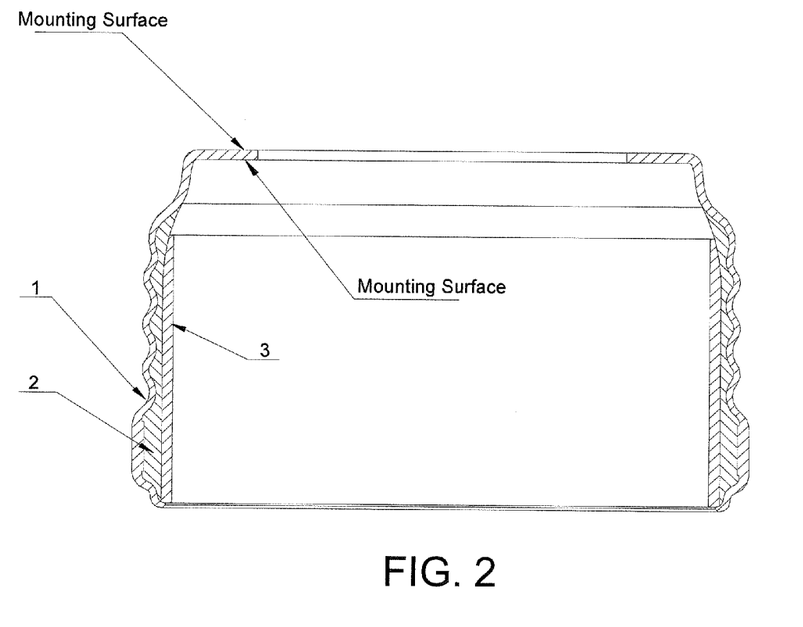
FIG. 2 is a diagram of the finished brake drum illustrated in one preferred embodiment of this invention.

To solve said technical problem, the present invention provides a method for producing brake drum, wherein three different metallic materials are used for the three-layer construction and two layers made of different molten metallic materials are cast based upon the prefabricated steel shell (with steel or gray iron for the structural layer and the Mo-containing, abrasion-resistant alloy cast iron for the braking friction layer) so that atoms from these two adjacent but different metallic layers inter-diffuse across the interface to form a solid fusant or an inter-metallic compound, thereby generating a very strong metallurgical bond; and with six rollers for position control and forming, the centrifugal casting machine drives and clamps the steel shell to maintain the roundness and size of the steel shell which later becomes softened when being heated within certain tolerances;

The method comprises the following steps S1, S2 and S3 and preferred sub-steps thereof:

S1, forming a steel brake drum shell 1 (FIG. 2);

S2, casting a structural layer 2 inside said brake drum shell (FIGS. 2); and

S3, casting a braking friction layer 3 at the inner side of said structural layer (FIG. 2).

Figure 31:
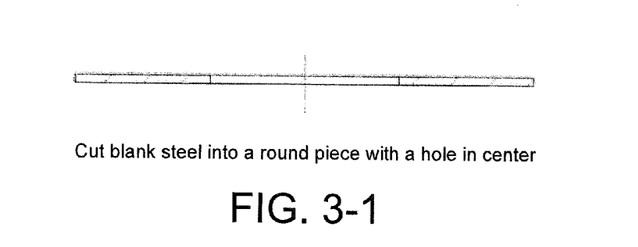
Figure 32:
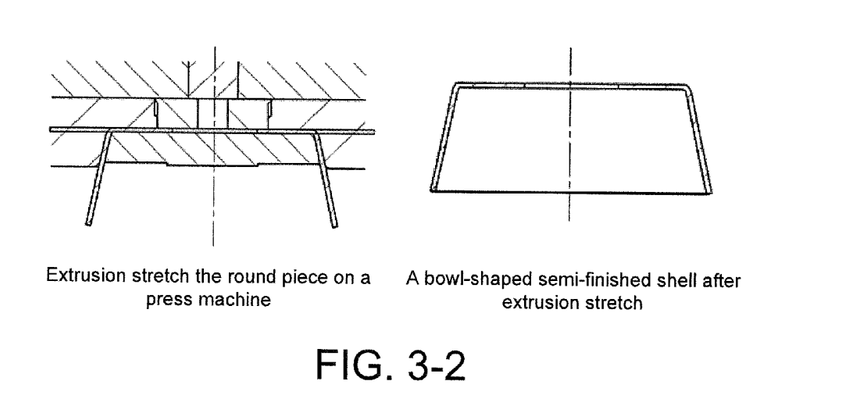
Figure 33:
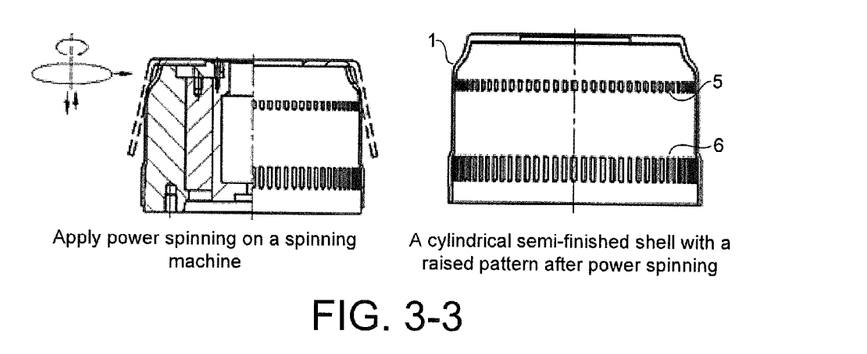
Figure 34:
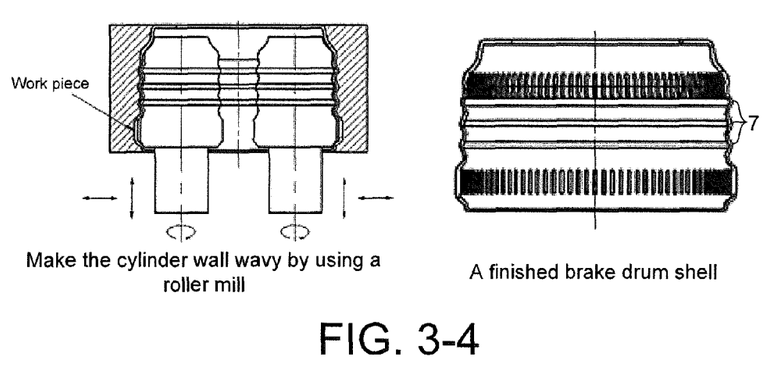

Preferably, step S1 comprises:

S1-1, the steel sheet being cut into a round piece with a hole in the middle (FIG. 3-1), then placed on a suitable die, and extrusion stretched by a press machine into a bowl-shaped semi-finished shell for the brake drum (FIG. 3-2);

Step 1-2, the bowl-shaped semi-finished brake drum shell being secured on a spinning machine by means of a suitable die, and pressed against the mold under the force of the spinning machine tailstock for spinning; subject to axial, radial and spinning movements as per preset programs by spinning rollers on either or both sides, the bowl-shaped semi-finished brake drum shell then being spin formed into a cylindrical semi-finished shell, and the inner side surface of said shell being made to have a raised pattern (FIG. 3-3); and Step 1-3, the cylindrical brake drum shell being subject to roll extrusion, wherein the cylindrical shell is placed into a rotatable roll-shape cavity and two forming rolls axially enter into the inner cavity of the cylindrical shell for rotating and radial movements, extruding the cylindrical shell against the roll-shape cavity to make the cylindrical wall wavy (FIG. 3-4).

Preferably, step S2 comprises sub-steps:

S2-1, said brake drum shell 1 being subject to induction heating or any other proper heating method to a temperature up to 800° C.~830° C.; and S2-2, with six rollers on the centrifugal casting machine for position control and forming, the steel shell being driven and clamped to maintain the roundness and size of the steel shell which later becomes softened when being heated within certain tolerances; said brake drum shell then being spun to the pre-determined appropriate speed; and molten steel or iron being poured at inner side of said brake drum shell to form said structural layer (FIG. 3-5A, FIG. 3-5B/3-6B).

Preferably, step S3 comprises sub-steps:

S3-1, said structural layer being held at a temperature between 1350° C. and 1400° C.;

S3-2, with six rollers on the centrifugal casting machine for position control and forming, the steel shell with cast structural layer being driven and clamped; said brake drum shell then being spun to the pre-determined appropriate speed; and 1400° C.~1430° C. Mo-containing molten iron being poured at inner side of said structural layer quickly to form said braking friction layer (FIG. 3-BA, FIG. 3-5B/3-6B); and S3-3, the heated post-cast brake drum being quickly moved into a holding furnace for 2-hour temperature holding in 750° C. or above environment and then slowly cooling down to ambient temperature.

Preferably, there is a sub-step S1-4 between sub-steps S1-3 and S2-1, which applies anti-oxidation treatment to the inner side surface of said brake drum shell.

Preferably, the present invention also includes a post-process, i.e. machining the inner surface and mounting surface of the cylindrical brake drum friction layer.

Preferably, said structural layer has a thickness of 3 mm~4 mm at its thinnest point and said braking friction layer has a thickness of 3 mm~4 mm.

The present invention provides a method for producing brake drum and makes the brake drum a one-piece construction that is constituted by three layers made of different metallic materials and having differential functions through said three steps, wherein the structural layer and the friction layer form a braking mechanism similar to the brake drum in the prior art, and the high-strength tenacious brake drum shell is arranged outside the braking mechanism so that the brake drum can have a relatively thinner wall thickness than those known in the prior art, which solves the problem of greater temperature difference between the inner and outer sides resulted from thick brake drum wall and minimizes the possibility of brake drum crack due to greater temperature difference.

Furthermore, the present invention uses the steel brake drum shell to enclose the structural layer and friction layer and therefore improves the structural strength and thermal conductivity of the friction layer and extends the brake drum's life. It should be noted that even if the friction layer cracks, with the protection of high-strength tenacious steel shell, the brake drum will not be thoroughly fractured and the safety of the brake drum is therefore improved.

The present invention also provides a brake drum made up of three different metallic materials, comprising:

a brake drum shell 1 (FIG. 2);

a structural layer arranged inside said brake drum shell 2 (FIG. 2); and a braking friction layer 3 made of Mo-containing abrasion-resistant alloy arranged inside said structural layer and for braking (FIG. 2).

Preferably, said brake drum shell has a raised pattern on its interior wall and said structural layer has a receiving groove accommodating to said raised pattern.

Because of the three-layer construction made of three different metallic materials, the outermost steel shell and the intermediate structural layer will improve the structural strength of the third layer—the friction layer, and protect it from being easily damaged. Meanwhile, because the steel shell has higher strength compared to a cast iron one, the wall made of steel will require a thinner thickness than the wall made of cast iron under the same structural strength. It is in this way that the brake drum provided by present invention uses the steel shell in place of a cast iron shell that has been universally existing in conventional brake drums and is able to thin out both the friction layer, improve its thermal conductivity, reduce the temperature difference between the inner and outer sides of the friction layer during braking, and minimize the occurrence of cracks on brake drum. Owing to metallurgical bonds between the steel shell and structural layer and the structural layer and friction layer respectively and in combination with a high-strength tenacious steel shell, the brake drum will not be easily fractured even if the friction layer cracks, and its safety is therefore improved.

BRIEF DESCRIPTION OF THE DRAWINGS

An embodiment of this invention and its advantages will now be described clearly by referring to accompanying drawings which are deemed as necessary for description of the embodiment or the prior art. It is evident that the accompanying drawings described below simply pertain to an embodiment of this invention, and persons skilled in this field may modify them within the scope of the present invention.

FIG. 3-1 to FIG. 3-5A/3-6A are the combined processing diagrams describing and showing in cross-section all brake drum producing stages involved in a preferred embodiment of this invention;

FIG. 3-5B/3-6B is a top plan view of FIGS. 3-5A and 3-6B. The above is the illustration to accompanying drawings while the following is the description to reference signs in the drawings.

The names of components in FIG. 2 and their corresponding reference signs in drawings are matched up as follows:

Brake drum shell 1; structural layer 2; friction layer 3

DETAILED DESCRIPTION OF THE PREFERRED EMBODIMENT

The core concept of the present invention is to provide a method for producing brake drum and a brake drum, wherein the brake drum, produced with this method and by using a three-layer construction made of three different metallic materials and a steel shell for the brake drum, is directed to improve the structural strength, thermal conductivity, service life, and safety of the brake drum.

In order to make the technical solution of the present invention more understandable, detailed description is made to this invention in conjunction with the accompanying drawings and the specific embodiment. The following description should be read in combination with the drawings.

Figure 1:
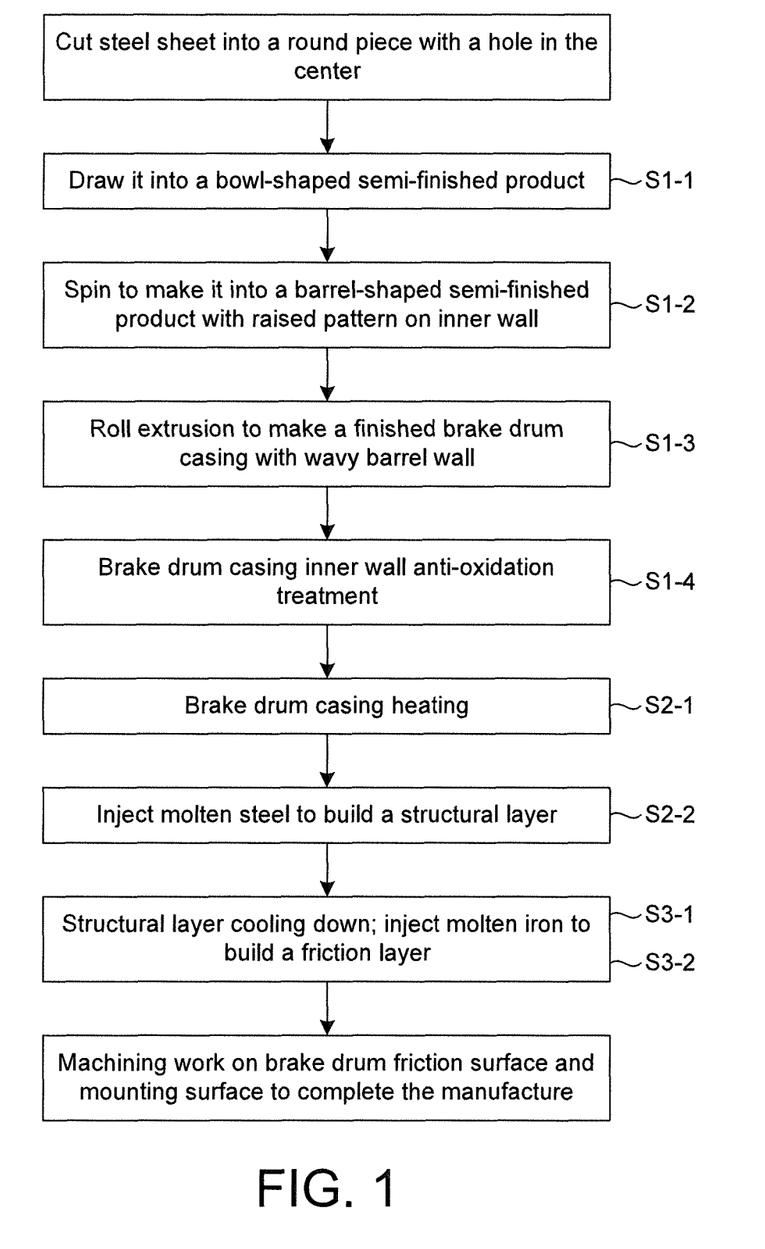
FIG. 1 is a process flowchart regarding the production of a brake drum as described in a preferred embodiment of this invention.

FIG. 1 is a process flowchart regarding the production of brake drum as described in a preferred embodiment of this invention.

The present invention provides a method for producing brake drum, wherein:

1. Three different metallic materials are used for the three-layer construction;

2. Two different molten metallic layers are cast on the interior wall of the steel shell at proper temperatures (with steel or gray iron for the structural layer and the Mo-containing, abrasion-resistant alloy cast iron for the braking friction layer) so that atoms from these two adjacent but different metallic layers inter-diffuse across the interface to form a solid fusant or an inter-metallic compound, thereby generating a very strong metallurgical bond; and 3. With six rollers for position control and forming, the centrifugal casting machine drives and clamps the steel shell to maintain the roundness and size of the steel shell which later becomes softened when being heated within certain tolerances;

An embodiment of the method comprises the following steps:

S1, (FIG. 3-1 to FIG. 3-4), the forming of a steel brake drum shell, wherein steel is used to fabricate the shell of the brake drum because the steel, in particular the high-quality steel, will contribute to a higher structural strength of the brake drum shell due to its high strength and tenacious properties;

S2: (FIG. 3-5A), forming a structural layer inside the brake drum shell, wherein a cast steel or cast iron structural layer intended to reinforce the structural strength of the brake drum is attached to the interior wall of the brake drum shell; and S3: (FIG. 3-6A), forming a friction layer on the inner side of the structural layer, wherein a friction layer is built on the inner side of the structural layer for the purpose of friction braking based upon the fact that the brake drum brakes by means of friction.

The present invention provides a method for producing brake drum and partitions the brake drum into three layers of differential functions through said three steps, including: the steel brake drum shell 1 (FIG. 2) reinforcing the structural strength of the brake drum, the structural layer 2 (FIG. 2) connecting the brake drum shell and the friction layer and furthering the structural strength of the brake drum, and the friction layer 3 (FIG. 2) used for friction braking, wherein the structural layer and the friction layer constitute the braking mechanism similar to the brake drum in the prior art, and the high-strength tenacious brake drum shell is arranged outside the braking mechanism so that the brake drum can have a relatively thinner wall thickness than those known in the prior art, thus solving the problem of greater temperature difference between the inner and outer sides resulted from thick brake drum wall and reducing the possibility of brake drum crack due to greater temperature difference. Furthermore, the present invention uses the steel brake drum shell and the structural layer to enclose the friction layer, which therefore improves the structural strength of the friction layer and extends the brake drum's life.

Additionally, the structural layer and the friction layer can be, and preferably are, made of different alloys, each adopted to the functions of the respective layers.

Figures 3, 5A:
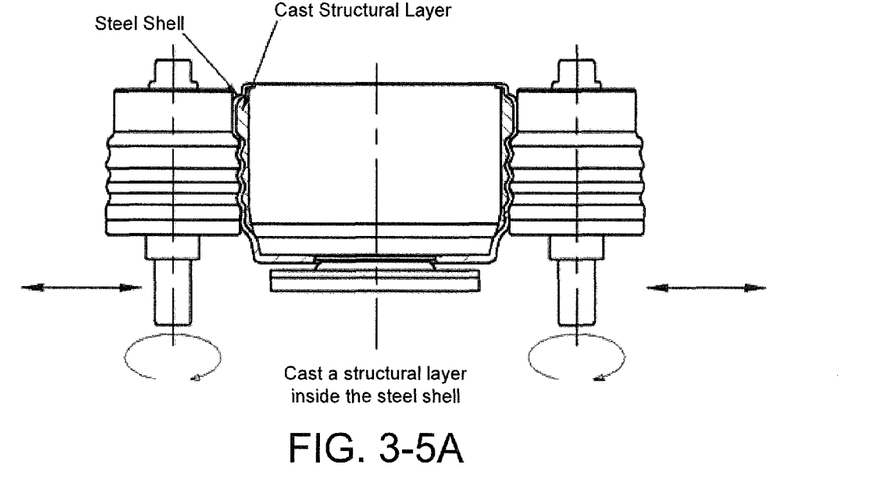
Figures 3, 6A:
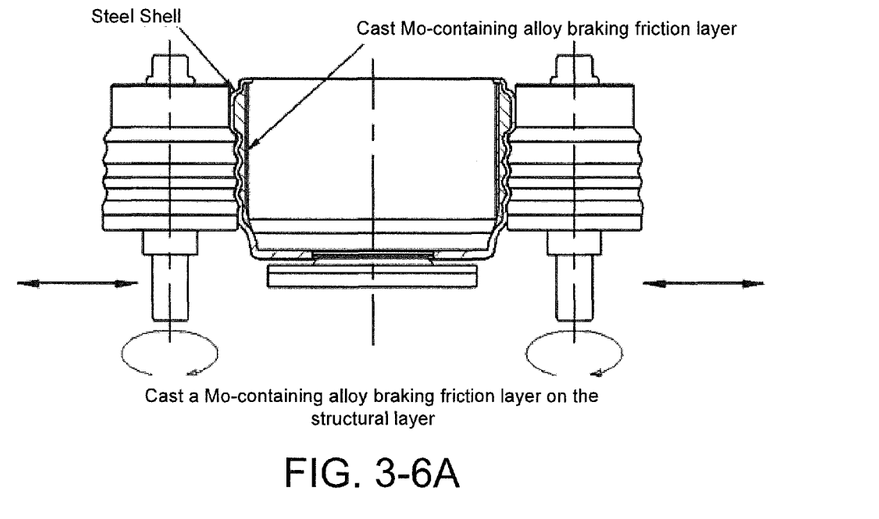
Figures 3, 5B:
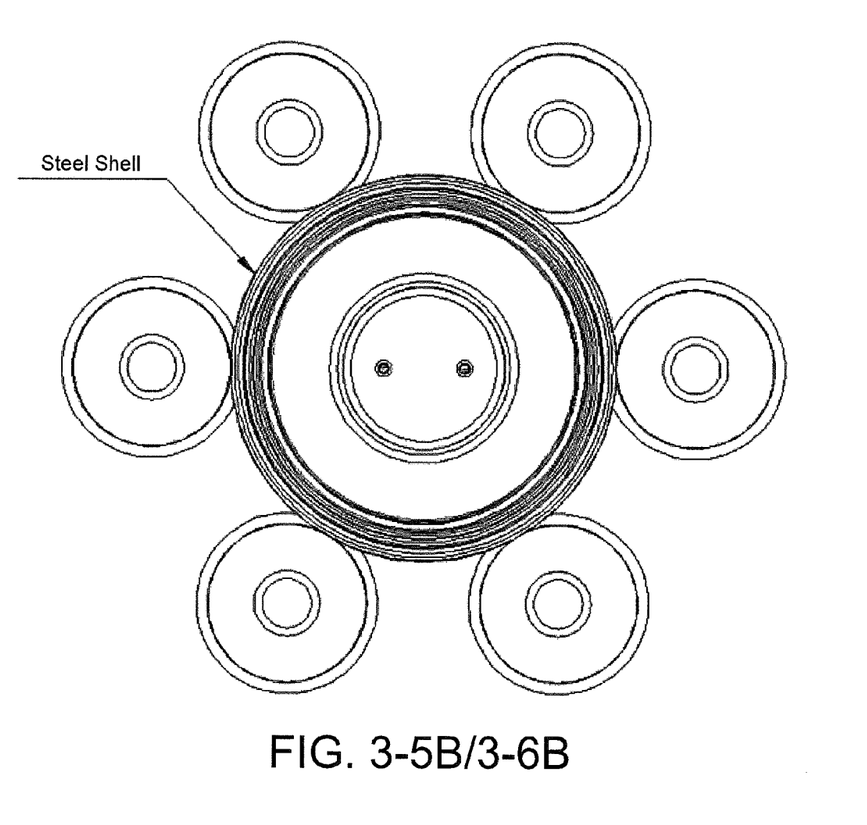

Referring to FIG. 1 and FIG. 3, step S1 specifically comprises the following sub-steps:

S1-1: extrusion stretch forming, wherein high-quality steel sheet is used as the material for brake drum shell and then extrusion stretched to form a bowl—a semi-finished spatial construction close to the shape of shell of the finished product (FIG. 3-2);

S1-2: power spinning, wherein the brake drum shell after extrusion stretch forming is subject to power spinning so that the semi-finished brake drum shell which is formed through extrusion as described in S1-1 and has a relatively thicker wall is then stretched and thinned in the axial direction, distributing the cross section of the shell as per mechanical properties of the brake drum and resulting in a cylindrical semi-finished brake drum shell with a raised pattern on the interior wall and a cross section of non-uniform strength (FIGS. 3-3); and S1-3: roll extrusion of the cylindrical brake drum shell to make the cylindrical wall wavy for the purpose of improving the strength and rigidity of the shell. Then the shell is finalized (FIG. 3-4).

Through the above steps, shown in FIGS. 3-1, 3-2, and 3-3, the high-quality steel sheet in this invention is formed into a semi-finished casing or shell 1 through extrusion stretch forming and obtains better structural precision, strength and rigidity through power spinning and roll extrusion. A raised pattern of protrusions or bosses 5, 6 is formed on the inner cylindrical surface of the shell. In FIG. 3-4, a series of axially spaced waves 7 are formed in casing 1.

Specifically, in one embodiment, step 2 comprises substeps:

S2-1: shell heating, wherein the brake drum shell 1 is subject to induction heating to a temperature of 800° C.~830° C. and becomes softened at and above 800° C. because of the use of high-strength steel, which then will lead to a higher degree of bonding between the brake drum casing and the structural layer; and S2-2: As shown in FIG. 3-5A, 3-5B, molten steel or first alloy iron injection, wherein a centrifugal casting machine with six rollers for position control and forming is used to drive, clamp, and spin the steel shell, and the molten steel or alloy or iron is then poured into the brake drum shell 1 to form a structural layer 2, while the brake drum shell is being spun. In this process, molten steel or alloy or iron injected into the brake drum shell will be spread uniformly across the internal surface of the shell under the centrifugal force, forming a compact structural layer with a thickness conforming to the waves 7 and patterns 5, 6 and providing a flat inner cylindric surface.

In a preferred embodiment of this invention, Step 3 specifically comprises sub-steps:

S3-1: structural layer temperature control, wherein the structural layer is controlled to a temperature of 1400° C.~1430° C.; and S3-2: As shown in FIG. 3-6A, 3-6B, injection of Mo-containing, abrasion-resistant alloy cast iron, wherein a centrifugal casting machine with six rollers for position control and forming is used to drive, clamp and spin said brake drum shell and 1400° C.~1430° C. Mo-containing, abrasion-resistant, molten gray alloy iron or Mo-containing alloy is then poured into said structural layer 2 to form said braking friction layer 3.

In the above two steps, S3-1 maintains the temperature of the structural layer at 1350° C.~1400° C. while the Mo-containing, abrasion-resistant, molten alloy iron has a temperature at 1400° C.~1430° C., at which temperatures atoms will inter-diffuse across the interface between the structural layer 2 steel or alloy and the friction layer 3 to form a fusant or an inter-metallic compound, thus generating a very strong metallurgical bond.

With reference to FIG. 3, it is process describing brake drum producing stages involved in a preferred embodiment of this invention.

S1-2 uses a power spinning device in FIG. 3-3 to realize the spinning, stretching, and thinning actions, and on this basis, the spinning die is designed so that it has recessions inside. In this way, the spinning wheel also plays the role of pressure roller during power spinning, building a raised pattern of protrusions 5, 6 on the interior wall of the brake drum shell. The raised pattern will increase the contact area with the structural layer and therefore will improve the bonding strength. It also provides tangential mechanical gripping to the structural layer.

To avoid oxidation on brake drum shell at high temperature by molten steel or iron, the present invention adds a sub-step S1-4 "anti-oxidation" between said S1-3 and said S2-1, which applies anti-oxidation treatment to the inner surface of the brake drum shell. To this end, conventional oxidation technique can be used; however, it should be noted that the solvent should be properly warmed for drying purpose after application if liquid solvent is used for anti-oxidation.

In a preferred embodiment of the present invention, there is also a post-process to the brake drum before a brake drum is considered as finished, that is, machining both the mounting surface and the inner surface of the friction layer.

Preferably, the thickness of the structural layer at its thinnest point is 3 mm~4 mm Preferably, the thickness of the braking friction layer is 3 mm~4 mm.

With reference to FIG. 2, a diagram of the finished brake drum is illustrated in a preferred embodiment of this invention.

The present invention also provides a brake drum, comprising: the brake drum shell 1; the structural layer 2 arranged inside the brake drum shell 1; and the braking friction layer 3 arranged inside the structural layer 2 and designed for braking.

From the above it is known that because of the three-layer construction of the brake drum, the outmost steel shell will improve the structural strength of the third layer—the friction layer 3 and protect it from being easily damaged. Meanwhile, as the shell made of steel has a higher strength than those made of iron (in particular the gray cast iron used for brake drums in the prior art), having the same structural strength, the steel can have a thickness smaller than cast iron. Thus, it is possible for the brake drum provided by the present invention to have a reduced thickness of the friction layer 3 due to the use of steel shell, which can narrow the temperature difference between inner side (the side in contact with brake shoes) and outer side of the friction layer 3 during braking, and avoid or alleviate the incidence of brake drum crack.

The brake drum provided by the present invention achieves deceleration and braking through the friction generated between brake shoes and the brake drum. Since the brake drum has to be stopped quickly when rotating at high speed, it will have to be subject to a substantially big braking force imposed by brake shoes and then generate a great torque on the brake drum shell 1, structural layer 2, and braking friction layer 3 respectively. To avoid distortion or dislocation and crack at the junction caused by such a large torque between the drum shell 1 and the structural layer 2 (which makes the brake drum shell 1, the structural layer 2 and the braking friction layer 3 tend to rotate relatively between themselves), in this embodiment, the brake drum shell 1 has a raised pattern on its interior wall and the structural layer 2 has a receiving groove accommodating to the raised pattern.

In the above construction, a raised pattern 5, 6 and a receiving groove are added between the brake drum shell 1 and the structural layer 2, which, acting like a spline together, guarantees the ability of both the brake drum shell 1 and the structural layer 2 to withstand the torque and therefore ensures the brake drum safety.

The above is a detailed description of a method for producing brake drum and a brake drum provided by the present invention. This paper applies a specific example to elaborate the principles and a preferred embodiment of the invention, and the illustration to the embodiment above is to facilitate understanding of the method and core idea of the present invention only. It should be pointed out that ordinary technicians engaged in this technical field may also make a number of improvements and modifications to the invention provided they do not depart from the principles thereof and these improvements and modifications made so shall be within the scope of the claims herein.

The invention claimed is:

1. A brake drum manufacturing method, wherein the method comprises:
    forming a brake drum shell;
    forming a structural layer inside said brake drum shell; and
    forming a friction layer inside said structural layer;
    wherein forming said structural layer comprises heating said brake drum shell being heated to 800° C.~830° C.; and
    while spinning said brake drum shell on a centrifugal casting machine, molten steel or iron are poured into said brake drum shell to form said structural layer.

2. A method for producing brake drum as claimed in claim 1, wherein forming said friction layer comprises:
    cooling said structural layer down to a temperature between 1350° C. and 1400° C.; and
    while spinning said brake drum shell on a centrifugal casting machine,
    pouring 1400° C.~1430° C. molten iron containing an appropriate amount of Mo or other alloying element being poured into said structural layer to form said friction layer as an abrasion-resistant cast iron friction layer.

3. A method for producing brake drum as claimed in claim 2, wherein forming said brake drum shell comprises forming an inner side surface of said brake drum shell into the raised pattern.

4. A method for producing brake drum as claimed in claim 3, including, after the roll extrusion, applying an anti-oxidation treatment to the inner side surface of said brake drum shell.

5. A method for producing brake drum as claimed in claim 1 including post-process machining work on an inner surface of the cylindrical brake drum friction layer.

6. A method for producing brake drum as claimed in claim 1, wherein said structural layer has a thickness of 3 mm~4 mm at its thinnest point and said braking friction layer has a thickness of 4 mm~5 mm.

7. A brake drum manufacturing method, wherein the method comprises:
    forming a brake drum shell;
    forming a structural layer inside said brake drum shell; and
    forming a friction layer inside said structural layer;
    wherein forming said brake drum shell includes:
    molding a high-quality steel sheet into round piece with a hole in the middle, then placed on a suitable die, and extrusion stretched by a press machine into a bowl-shaped semi-finished shell for the brake drum;
    forming the bowl-shaped semi-finished brake drum shell in a suitable die into a cylindrical semi-finished shell, and shaping an inner side surface of said shell to have a raised pattern; and
    the cylindrical brake drum shell being subject to roll extrusion to make the cylindrical wall wavy.

8. A method for producing brake drum as claimed in claim 7 including post-process machining work on an inner surface of the cylindrical brake drum friction layer.

9. A method for producing brake drum as claimed in claim 8, wherein said structural layer has a thickness of 3 mm~4 mm at its thinnest point and said braking friction layer has a thickness of 4 mm~5 mm.

10. A brake drum comprising:
    a brake drum shell;
    a braking structural layer arranged inside said brake drum shell; and
    a braking friction layer inside said structural layer for braking;
    wherein said brake drum shell has a raised pattern on its inner surface and said structural layer has a receiving groove accommodating to said raised pattern; and wherein:
    three different metallic materials are used for three-layer construction of the shell, the structural layer and the friction layer are made of different molten metallic materials cast within the steel shell with steel or gray iron for the structural layer and a Mo-containing, abrasion-resistant alloy cast iron for the braking friction layer so that atoms from these two adjacent but different metallic materials inter-diffuse across an interface to form a solid fusant or an inter-metallic compound, thereby generating a very strong metallurgical bond.

\* \* \* \* \*